(12) United States Patent
Chang

(10) Patent No.: US 9,841,132 B2
(45) Date of Patent: Dec. 12, 2017

(54) QUICK CONNECTOR

(71) Applicant: MEI THUNG CO., LTD., Taichung (TW)

(72) Inventor: Sheng-Ming Chang, Taichung (TW)

(73) Assignee: Mei Thung Co., Ltd., Taichung (TW)

( * ) Notice: Subject to any disclaimer, the term of this patent is extended or adjusted under 35 U.S.C. 154(b) by 2 days.

(21) Appl. No.: 15/150,717

(22) Filed: May 10, 2016

(65) Prior Publication Data

US 2017/0328506 A1 Nov. 16, 2017

(51) Int. Cl.
| | |
|---|---|
| *F16L 37/46* | (2006.01) |
| *F16L 37/38* | (2006.01) |
| *F16L 37/10* | (2006.01) |
| *F16L 29/00* | (2006.01) |
| *F16K 5/04* | (2006.01) |
| *F16K 31/44* | (2006.01) |
| *F16L 37/23* | (2006.01) |

(52) U.S. Cl.
CPC .............. *F16L 37/46* (2013.01); *F16L 29/007* (2013.01); *F16L 37/101* (2013.01); *F16L 37/38* (2013.01); *F16K 5/0421* (2013.01); *F16K 31/445* (2013.01); *F16L 37/23* (2013.01)

(58) Field of Classification Search
CPC . F16L 37/38; F16L 37/46; F16L 37/10; F16L 37/101; F16L 29/007; F16L 37/23; F16K 5/0421; F16K 31/445; Y10T 137/86743; Y10T 137/87973; Y10T 137/87941
USPC ............ 251/149.8, 142, 205, 208, 209, 304, 251/309–311, 340, 343, 344, 345, 352, 251/149.9

See application file for complete search history.

(56) References Cited

U.S. PATENT DOCUMENTS

| | | | | |
|---|---|---|---|---|
| 453,109 | A * | 5/1891 | Dreisorner | F16K 1/123 251/344 |
| 486,722 | A * | 11/1892 | Loss | F16K 47/08 137/625.33 |
| 1,263,542 | A * | 4/1918 | Evans | F16K 1/14 251/181 |
| 1,913,971 | A * | 6/1933 | Benn | F16L 37/107 251/149 |
| 2,925,991 | A * | 2/1960 | Hempel | B05B 1/3026 251/127 |

(Continued)

FOREIGN PATENT DOCUMENTS

| | | | | |
|---|---|---|---|---|
| DE | 1078826 B | * | 3/1960 | ............... F16L 37/23 |
| DE | 2840564 A1 | * | 3/1980 | ........... F16K 31/445 |
| FR | 1571485 A | * | 6/1969 | ............... F16L 29/00 |

*Primary Examiner* — Reinaldo Sanchez-Medina
*Assistant Examiner* — David Colon Morales
(74) *Attorney, Agent, or Firm* — Rosenberg, Klein & Lee

(57) ABSTRACT

A quick connector includes a valve body and a rotatable ring fitting over the valve body. The rotatable ring is rotatable with respect to the valve body. When a sealing member of the rotatable ring is rotated to a full open position, an exit end and an entrance end of the valve body are both encompassed by an opening of the sealing member and communicating with each other. When the sealing member is rotated from the full open position to a full close position, one of the exit end and the entrance end is moved out of the opening and blocked by the sealing member, so that the entrance end and the exit end do not communicate with each other.

4 Claims, 10 Drawing Sheets

(56) References Cited

U.S. PATENT DOCUMENTS

| | | | | |
|---|---|---|---|---|
| 3,005,468 A * | 10/1961 | Erwin | | F16K 3/26 137/556 |
| 3,033,226 A * | 5/1962 | Allen | | F16K 5/0421 137/315.07 |
| 3,106,379 A * | 10/1963 | Sciuto | | F16K 35/02 251/100 |
| 3,135,293 A * | 6/1964 | Hulsey | | F16K 5/0421 137/625.3 |
| 3,404,705 A * | 10/1968 | Zopf | | F16L 37/23 137/625.25 |
| 3,477,688 A * | 11/1969 | Cruse | | F16L 37/23 251/149.9 |
| 3,589,673 A * | 6/1971 | Cruse | | F16L 37/46 251/149.1 |
| 3,987,999 A * | 10/1976 | Savage | | F16K 3/32 251/205 |
| 4,765,657 A * | 8/1988 | Cruse | | F16L 37/46 251/149.9 |
| 4,848,403 A * | 7/1989 | Pilolla | | F16K 3/085 137/625.31 |
| 5,045,068 A * | 9/1991 | Kawai | | G05D 7/0186 251/200 |
| 5,332,194 A * | 7/1994 | Austin, Jr. | | A61C 1/0061 251/344 |
| 5,451,031 A * | 9/1995 | Purvis | | F16L 37/23 251/100 |
| 5,782,455 A * | 7/1998 | Burnworth | | F16K 5/0421 251/343 |
| 5,967,491 A * | 10/1999 | Magnuson | | F16L 37/23 137/614.05 |
| 6,089,539 A * | 7/2000 | Kouda | | F16L 37/23 251/149.2 |
| 6,702,254 B2 * | 3/2004 | Noble | | F16L 37/23 251/149.1 |
| 8,356,794 B1 * | 1/2013 | Liu | | F16L 37/23 251/149.6 |
| 2009/0108224 A1 * | 4/2009 | Clasen | | F16K 3/085 251/315.04 |
| 2010/0127198 A1 * | 5/2010 | Cozza | | F16L 37/23 251/149.1 |
| 2012/0042971 A1 * | 2/2012 | Py | | A61M 39/10 137/798 |

* cited by examiner

QUICK CONNECTOR

BACKGROUND OF THE INVENTION

Field of the Invention

The present invention relates to a quick connector, in particular to a female connector structure capable of mating with a male connector quickly.

Description of the Prior Art

In U.S. Pat. No. 6,702,254, a quick connector is disclosed. The quick connector includes a valve body (40) having a front chamber (44) and a rear chamber (46). A through hole (50) is connected to the front chamber, and a through hole (52) is connected to the rear chamber. When a sleeve (70) is moved with respect to the valve body, the communication between the two through holes are opened or closed by an annular groove (84). Similar structures are provided in U.S. Pat. No. 3,404,705, U.S. Pat. No. 3,589,673, U.S. Pat. No. 4,765,657, and U.S. Pat. No. 5,967,491. However, in the quick connector, the valve body can only be opened or closed, and the size of the opening of the valve body cannot be operated, so that the amount of gas flowing through the quick connector cannot be controlled.

While in US publication 20100127198, a quick connector is disclosed. The quick connector includes a rotatable member (25) and a fixed member (34). The rotatable member and the fixed member respectively have elongated holes (24, 27). By rotating the rotatable member with respect to the fixed member, the overlapped area between the two elongated holes can be adjusted, so that the quick connector can be opened or closed, and the size of the opening of the quick connector can be operated, so that the amount of gas flowing through the quick connector can be controlled as well. However, because the two elongated holes are formed along the axial direction of the quick connector, when high pressure gases enter into the quick connector, the high pressure gases push a shoulder portion (26) of the rotatable member toward a sealing member (28), so that a rotation resistance is formed between the rotatable member and the fixed member, and the rotatable member cannot rotate with respect to the fixed member smoothly.

SUMMARY OF THE INVENTION

One object of the present invention is to provide a quick connector in which when a rotatable ring of the quick connector is rotated to control the open or the close of the quick connector or to control the amount of the gas flowing through the quick connector, the rotatable ring can be rotated with respect to the valve body smoothly.

To achieve the above and other objects, a quick connector being a female connector and for mating with a male connector communicating with a high pressure pipeline comprises a valve body and a rotatable ring. The valve body is of tubular shape and has a partition segment for partitioning the interior of the valve body into a front chamber and a rear chamber. The valve body has at least one paired gas inlet and gas outlet. The gas inlet only communicates with the front chamber, and the gas outlet only communicates with the rear chamber. An exit end of the gas inlet and an entrance end of the gas outlet are located at the same side of the outer periphery of the partition segment and adjacent to each other. The rotatable ring is fitting over the outer periphery of the partition segment. The rotatable ring is rotatable to a full open position or a full close position with respect to the valve body. The rotatable ring has a sealing member corresponding to the side of the partition segment having the exit end and the entrance end. The sealing member has an opening for encompassing the exit end and the entrance end at the same time. When the sealing member is rotated to the full open position along with the rotation of the rotatable ring, the exit end and the entrance end are full encompassed by the opening and communicating with each other. When the sealing member is gradually rotated from the full open position toward the full close position, one of the exit end and the entrance end is gradually moved out of the opening and eventually blocked by the sealing member, such that the exit end and the entrance end do not communicate with each other.

Wherein, the rotatable ring has an inner ring portion and an outer ring portion fitting over the inner ring portion. The inner ring portion has a through hole defined through the radial direction of the inner ring portion for receiving the sealing member, and the sealing member has a closed portion adjacent to the opening. When one of the exit end and the entrance end is moved out of the opening, the end moved out of the opening is blocked by the closed portion, such that the exit end and the entrance end do not communicate with each other.

Wherein, the valve body has a sleeving portion formed at the rear chamber, a quick-release assembly has a sleeve fitting over the outer periphery of the sleeving portion, and a spring is fitted between the sleeving portion and the sleeve for pushing the sleeve forward with respect to the sleeving portion. A plurality of stopping balls is surrounding the sleeving portion for mating with the male connector and for preventing the male connector from being detached off the quick connector after the quick connector is mated with the male connector. When the sleeve is moved backward with respect to the sleeving portion, the male connector is releasable from the quick connector.

Wherein, the sleeving portion and the sleeve are partially recessed at corresponding portions thereof so as to form a groove together. The outer ring portion of the rotatable ring has a stopping block inserted into the groove along the axial direction of the rotatable ring. When the stopping block is moved to two ends of the groove along with the rotation of the rotatable ring, the stopping block is located at the full open position and the full close position, respectively. The sleeve has a recessed portion axially extending from the groove. When the rotatable ring is located at the full close position, the recessed portion is aimed at the stopping block, and the sleeve is only moved backward with respect to the sleeving portion when the recessed portion is aimed at the stopping block.

Wherein, inner ring portion has an inner surface facing the partition segment, the inner surface is located at a wall of the inner ring portion having the closed portion and adjacent to the through hole, and a gas drain groove is recessed from the inner surface and closely adjacent to the through hole. When one of the exit end and the entrance end is moved out of the opening, the end moved out of the opening communicates with the gas drain groove so as to relief gases left in the rear chamber.

DETAIL PORTIONED DESCRIPTION OF THE PREFERRED EMBODIMENTS

Please refer to FIGS. 1 to 10, which illustrate a quick connector according to embodiments of the present invention. The embodiments are provided for illustrative purposes only and not formed as limitations of the present invention.

Figure 1:
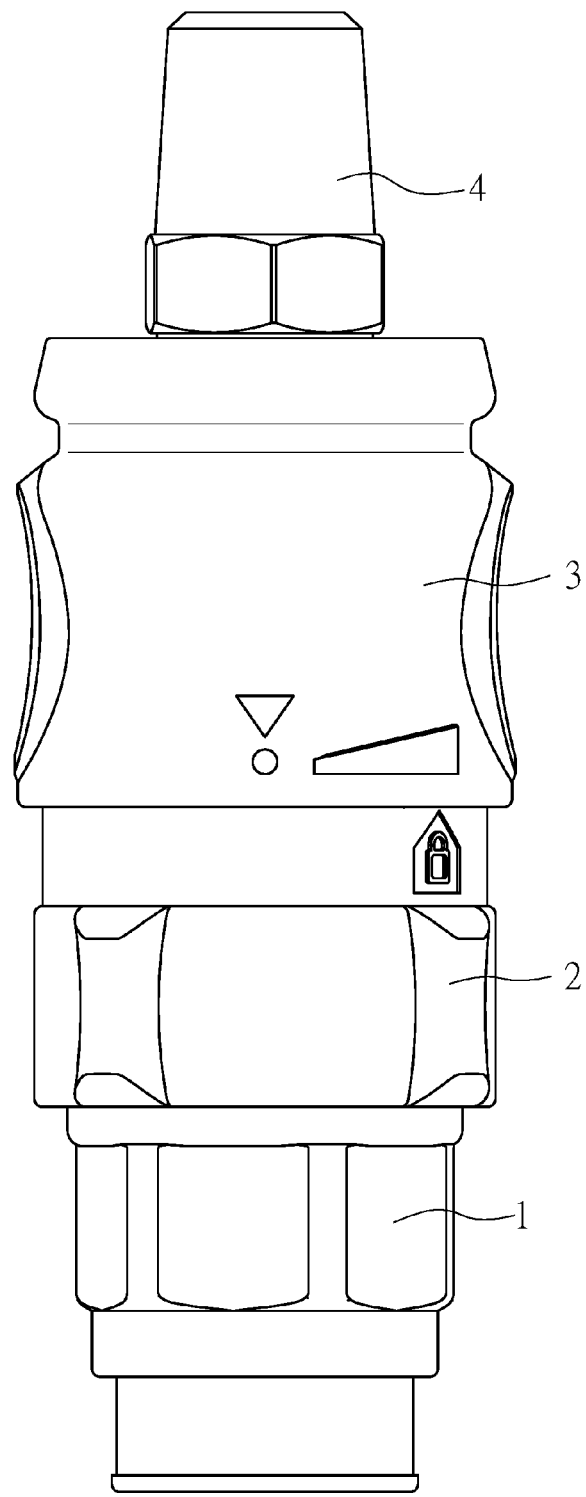
FIG. 1 illustrates a plan view of a quick connector according to an exemplary embodiment of the present invention, wherein the rotatable ring is rotated to the full open position.

In the embodiment, a quick connector is provided. The quick connector is a female connector, as shown in FIG. 1. The quick connector comprises a valve body 1, a rotatable ring 2, and a quick-release assembly 3. The quick connector is provided for mating with a male connector 4 communicating with a high pressure pipeline (not shown).

Figure 2:
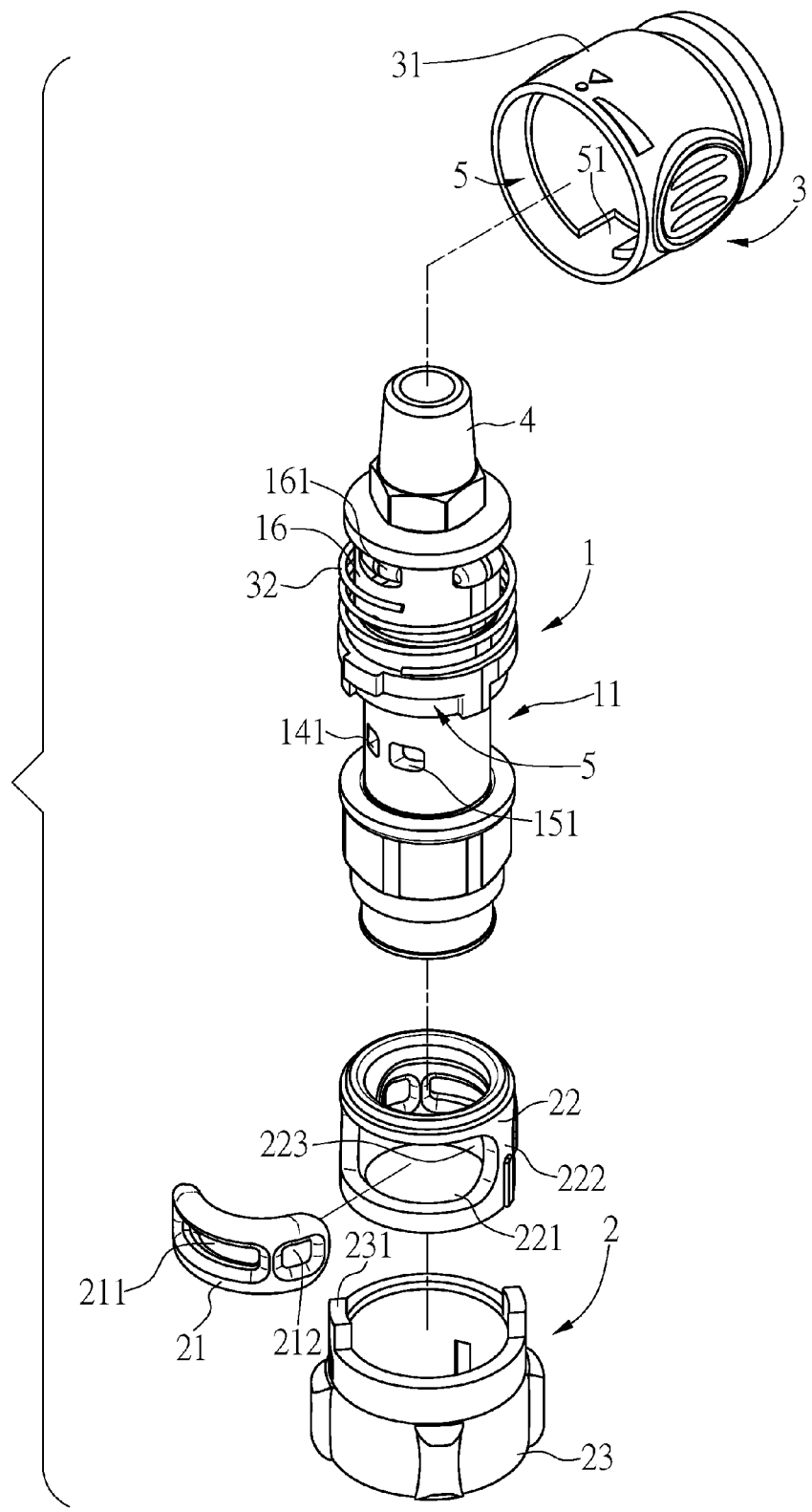
FIG. 2 illustrates an exploded view of the quick connector.
Figure 3:
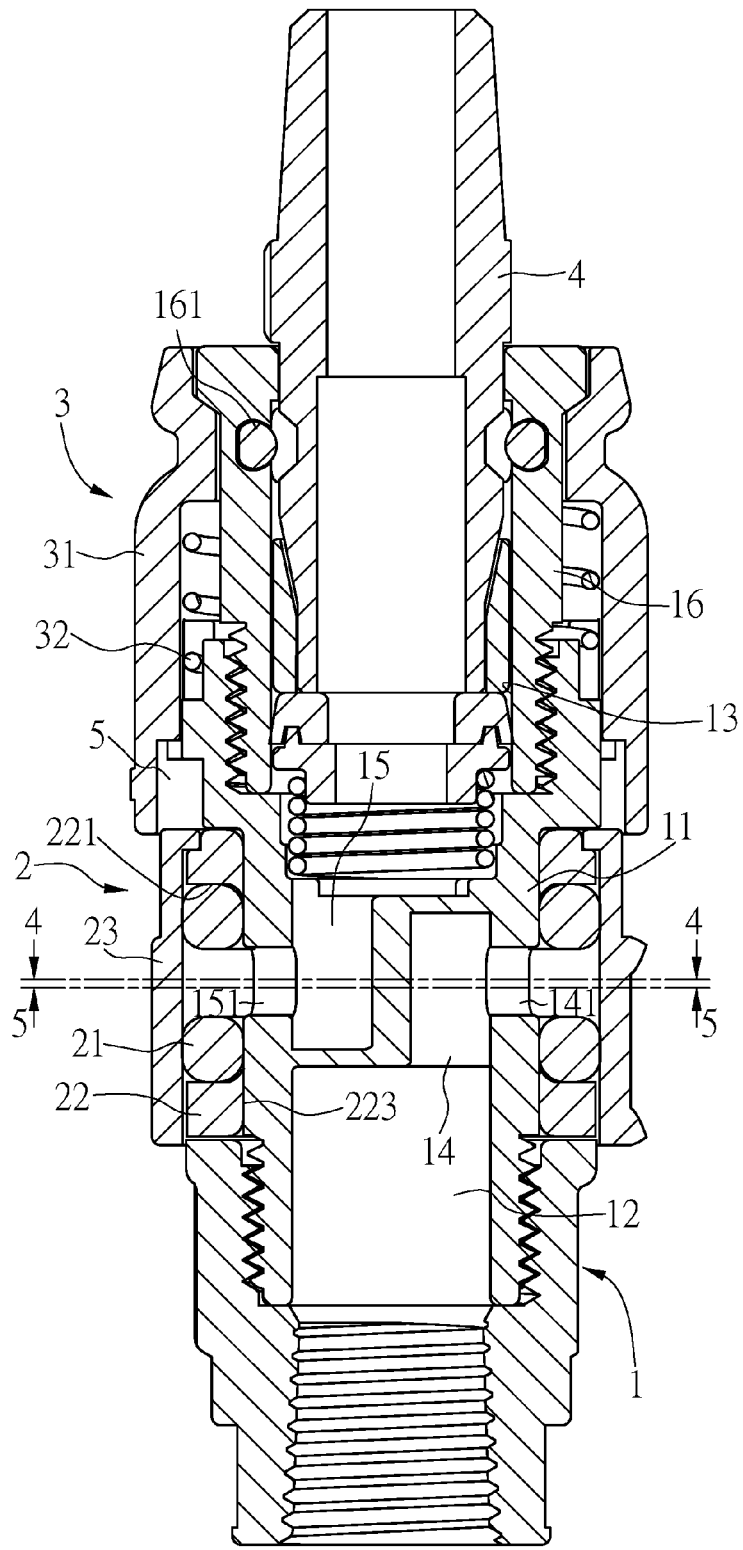
FIG. 3 illustrates a sectional view of the quick connector.
Figure 4:
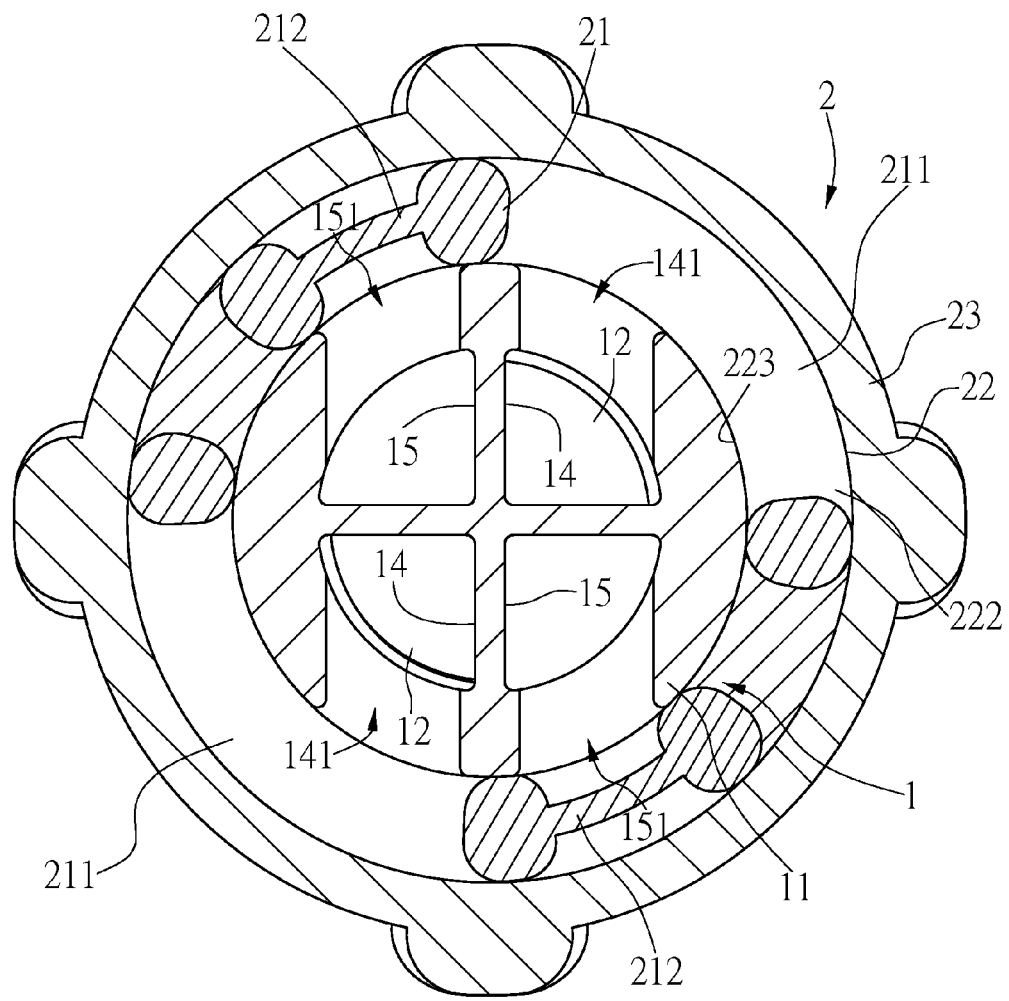
FIG. 4 illustrates a sectional view along line 4-4 shown in FIG. 3.
Figure 5:
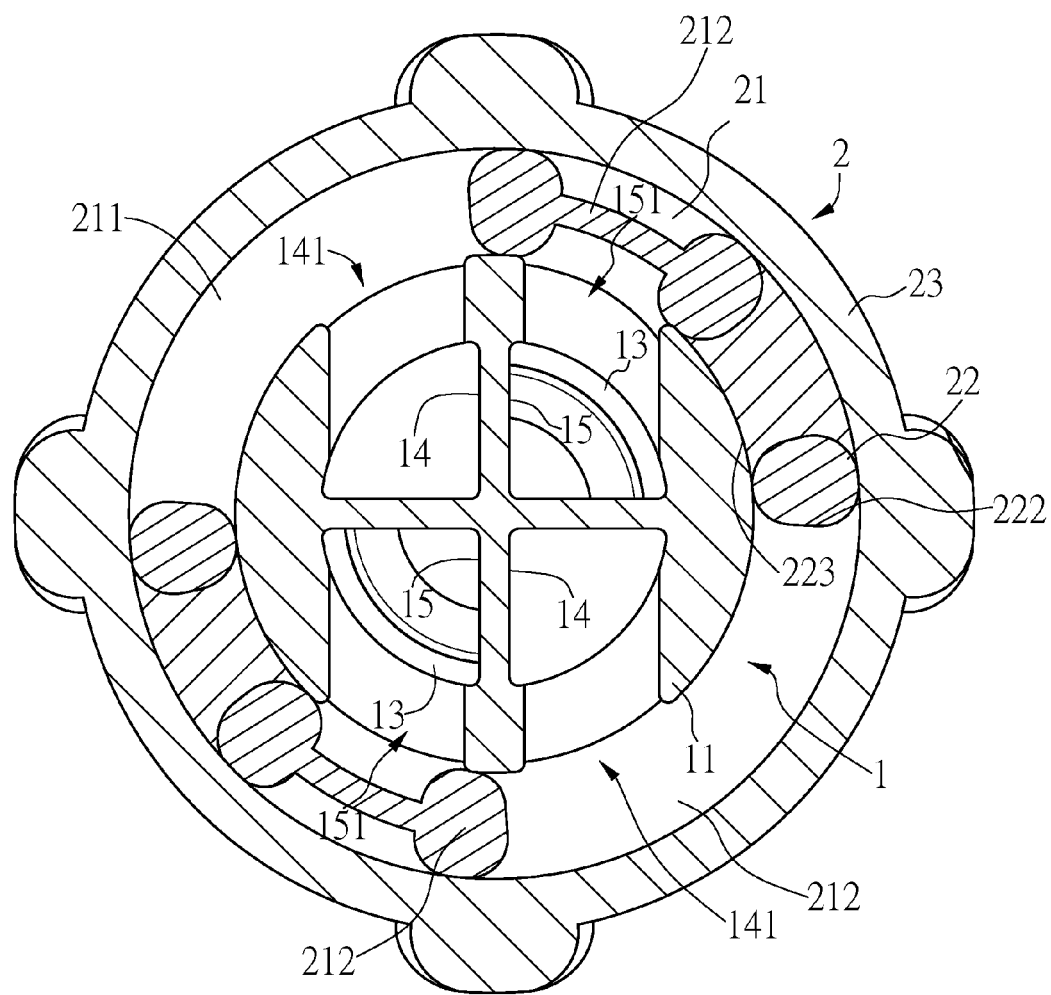
FIG. 5 illustrates a sectional view along line 5-5 shown in FIG. 3.

As shown in FIGS. 2 and 3, the valve body 1 is of tubular shape and has a partition segment 11 for partitioning the interior of the valve body 1 into a front chamber 12 and a rear chamber 13. As shown in FIGS. 4 and 5, the valve body 1 has a gas inlet 14 and a gas outlet 15 in pair (in this embodiment, the valve body 1 has two pairs of gas inlets 14 and gas outlets 15; namely, the valve body 1 has two gas inlets 14 and two gas outlets 15). The gas inlet 14 only communicates with the front chamber 12 (as shown in FIG. 4). The gas outlet 15 only communicates with the rear chamber 13 (as shown in FIG. 5). An exit end 141 of the gas inlet 14 is located at the outer periphery of the partition segment 11. An entrance end 151 of the gas outlet 15 is located at the outer periphery of the partition segment 11. The exit end 141 and the entrance end 151 are located at the same side of the valve body 1 and adjacent to each other.

Figure 6:
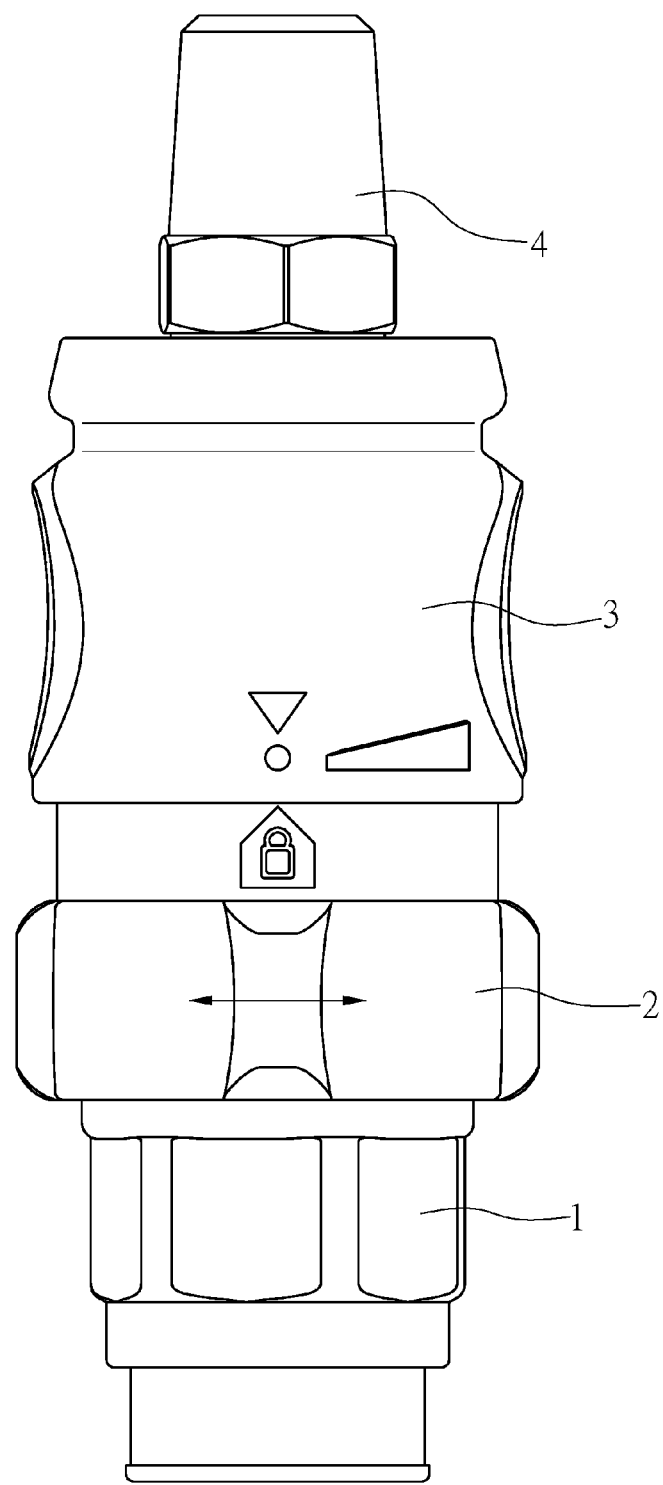
FIG. 6 illustrates another plan view of the quick connector, wherein the rotatable ring is rotated to the full close position.
Figure 7:
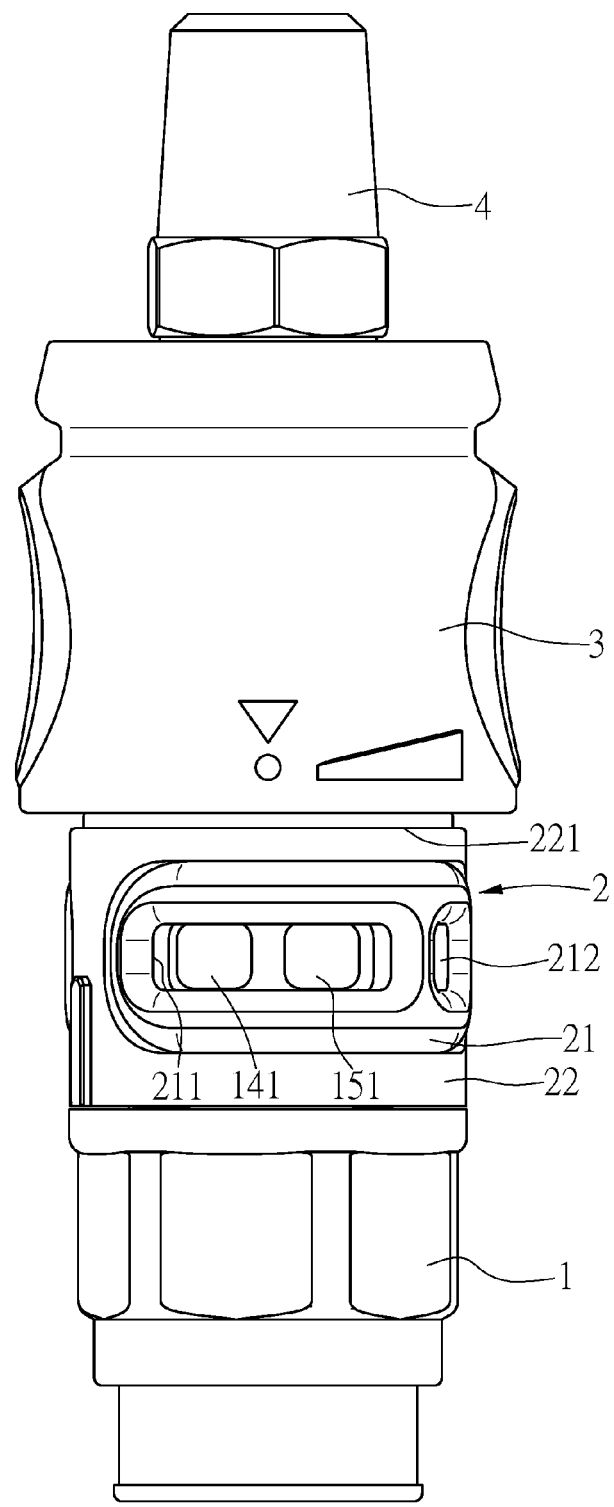
FIG. 7 illustrates a schematic view showing that, when the rotatable ring is rotated to the full open position as shown in FIG. 1, the exit end and the entrance end in the opening are in communication with each other.

As shown in FIGS. 1 to 6, the rotatable ring 2 is fitting over the outer periphery of the partition segment 11. The rotatable ring 2 is rotatable to a full open position (as shown in FIG. 1) or to a full close position (as shown in FIG. 6) with respect to the valve body 1. The rotatable ring 2 has a sealing member 21 corresponding to the side of the partition segment 11 having the exit end 141 and the entrance end 151. The sealing member 21 has an opening 211 for encompassing the exit end 141 and the entrance end 151 at the same time. When the sealing member 21 is rotated to the full open position along with the rotation of the rotatable ring 2, the exit end 141 and the entrance end 151 are fully encompassed by the opening 211 and communicating with each other (as shown in FIG. 7). While when the sealing member 21 is gradually rotated from the full open position toward the full close position, in one embodiment, the entrance end 151 is gradually moved out of the opening 211 and eventually blocked by the sealing member 21, such that the exit end 141 and the entrance end 151 do not communicate with each other; in another embodiment, the exit end 141 is gradually moved out of the opening 211 and eventually blocked by the sealing member 21, such that the exit end 141 and the entrance end 151 do not communicate with each other.

Figure 8:
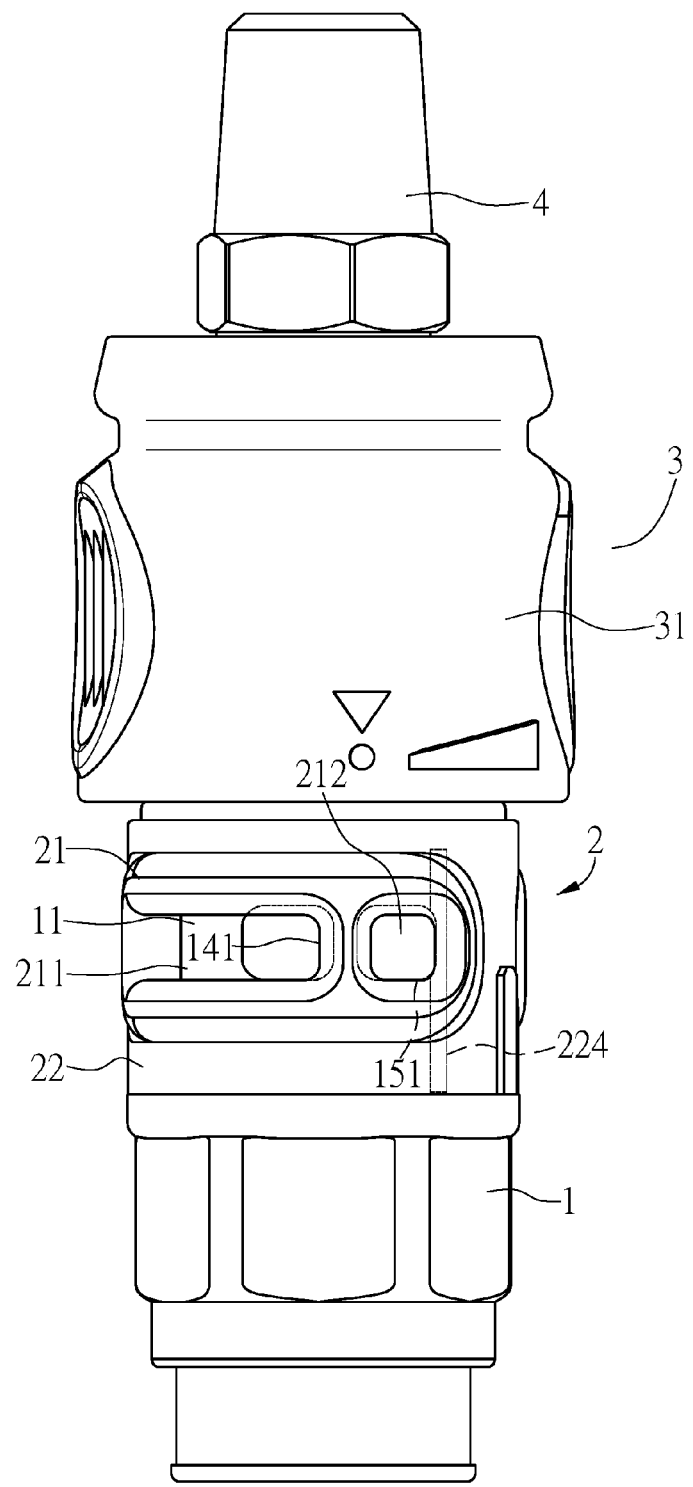
FIG. 8 illustrates a schematic view showing that, when the rotatable ring is rotated to the full close position as shown in FIG. 6, the entrance end is moved out of the opening, blocked by the sealing member, and not in communication with the exit end, and the entrance end is in communication with the gas drain groove when the entrance end is moved out of the opening.

As shown in FIGS. 2 to 5. In this embodiment, the rotatable ring 2 has an inner ring portion 22 and an outer ring portion 23 fitting over the inner ring portion 22. The inner ring portion 22 has a through hole 221 defined through the radial direction of the inner ring portion 22 for receiving the sealing member 21. The sealing member 21 has a closed portion 212 adjacent to the opening 211. When the entrance end 151 is moved out of the opening 211, the entrance end 151 is blocked by the closed portion 212 and the entrance end 151 does not communicate with the exit end 141. The inner ring portion 22 has an inner surface 223 facing the partition segment 11. The inner surface 223 is located at a wall 222 of the inner ring portion 22 having the closed portion 212 and adjacent to the through hole 221. A gas drain groove 224 is recessed from the inner surface 223 and closely adjacent to the through hole 221. In this embodiment, when the entrance end 151 is moved out of the opening 211, the entrance end 151 is in communication with the gas drain groove 224 (as shown in FIG. 8) so as to relief the gas left in the rear chamber 13.

As shown in FIGS. 2 and 3, the valve body 1 has a sleeving portion 16 formed at the rear chamber 13. The quick-release assembly 3 has a sleeve 31 fitting over the outer periphery of the sleeving portion 16. A spring 32 is fitted between the sleeving portion 16 and the sleeve 31 for pushing the sleeve 31 forward with respect to the sleeving portion 16. A plurality of stopping balls 161 is surrounding the sleeving portion 16 for mating with the male connector 4 and for preventing the male connector 4 from being detached off the quick connector after the quick connector is mated with the male connector 4. When the sleeve 31 is moved backward with respect to the sleeving portion 16, the male connector 4 is releasable from the quick connector.

Figure 9:
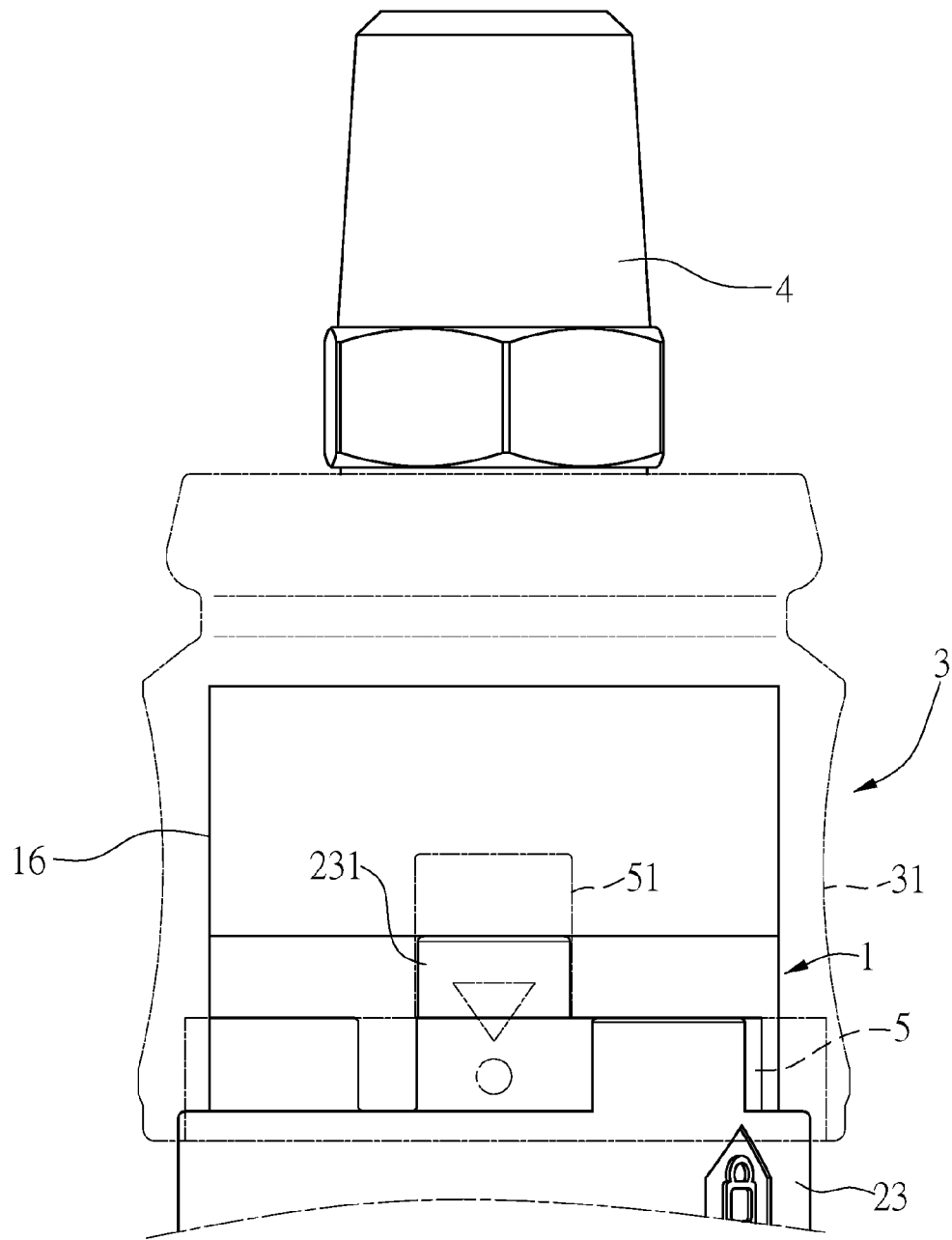
FIG. 9 illustrates a schematic view showing the stopping block is moved to one end of the right side of the groove, indicating the full open position.
Figure 10:
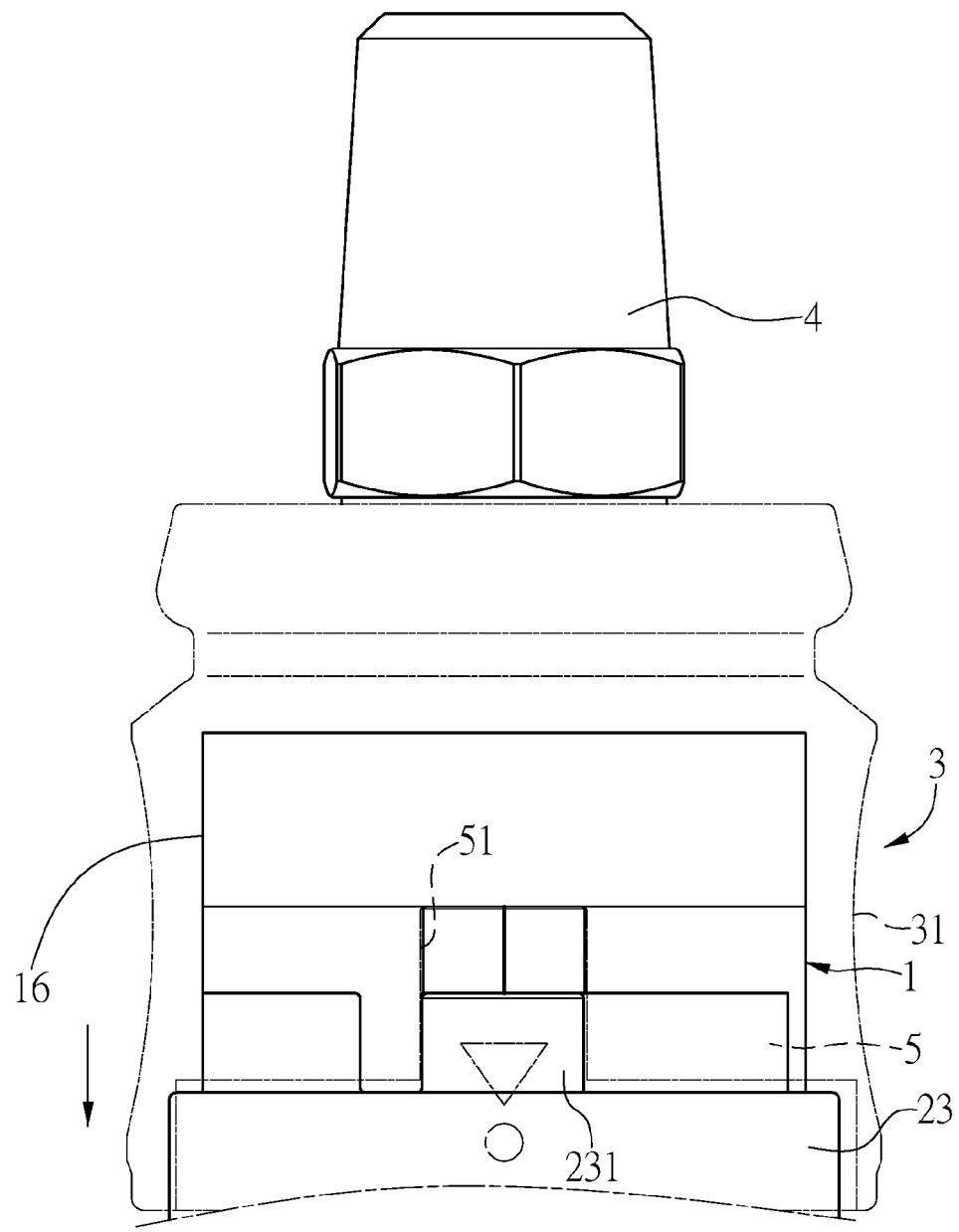
FIG. 10 illustrates a schematic view showing the stopping block is moved to one end of the left side of the groove, indicating the full close position, and the recessed portion of the sleeve is aimed at the stopping block, so that the recessed portion can be moved upward to allow a male connector detaching off the quick connector, or the recessed portion can be moved downward to position with the male connector.

As shown in FIGS. 2, 9, and 10, the sleeving portion 16 and the sleeve 31 are partially recessed at corresponding portions thereof, so that the recessed part of the sleeving portion 16 and the recessed part of the sleeve 31 form a groove 5 together. The outer ring portion 23 of the rotatable ring 2 has a stopping block 231 inserted into the groove 5 along the axial direction of the rotatable ring 2. As shown in FIG. 9, when the stopping block 231 is moved to one end of the right side of the groove 5 along with the rotation of the rotatable ring 2, the stopping block 231 is located at the full open position; while when the stopping block 231 is moved to one end of the left side of the groove 5 along with the rotation of the rotatable ring 2, the stopping block 231 is located at the full close position. The sleeve 31 has a recessed portion 51 axially extending from one end of the left side of the groove 5, wherein when the rotatable ring 2 is located at the full close position, the recessed portion 51 is aimed at the stopping block 231, and the sleeve 31 is only moved backward with respect to the sleeving portion 16 when the recessed portion 51 is aimed at the stopping block 231.

As above, because the exit end 141 of the gas inlet 14 and the entrance end 151 of the gas outlet 15 are located at the outer periphery of the partition segment 11, when the high pressure gas enters into quick connector, the gas is flowing through the front chamber 12, the gas inlet 14, and ejected from the exit end 141 along a radial direction of the quick connector. And then, the gas is further flowing through the opening 211, the entrance end 151, and ejected from the gas outlet 15. Therefore, in the opening 211, the gas ejected from the exit end 141 pushes the rotatable ring 2 only along the radial direction but not the axial direction, so that the rotatable ring 2 is not pushed toward the valve body 1. Accordingly, when the rotatable ring 2 is rotated to control the quick connector to be opened or closed or to control the amount of the gas flowing through the quick connector, the rotatable ring 2 can be rotated with respect to the valve body 1 smoothly.

What is claimed is:

1. A quick connector being a female connector and for mating with a male connector communicating with a high pressure pipeline, wherein the quick connector comprises:

a valve body, being of tubular shape and having a partition segment for partitioning an interior of the valve body into a front chamber and a rear chamber, wherein the valve body has at least one paired gas inlet and gas outlet, the gas inlet only communicates with the front chamber and the gas outlet only communicates with the rear chamber, an exit end of the gas inlet and an entrance end of the gas outlet are located at the same side of an outer periphery of the partition segment and adjacent to each other;

a rotatable ring fitting over the outer periphery of the partition segment, wherein the rotatable ring is rotatable to a full open position or a full close position with respect to the valve body, wherein the rotatable ring has a sealing member corresponding to the side of the partition segment having the exit end and the entrance end, the sealing member has an opening for encompassing the exit end and the entrance end at the same time, wherein when the sealing member is rotated to the full open position along with the rotation of the rotatable ring, the exit end and the entrance end are fully encompassed by the opening and communicating with each other, and wherein when the sealing member is gradually rotated from the full open position toward the full close position, one of the exit end and the entrance end is gradually moved out of the opening and eventually blocked by the sealing member, such that the exit end and the entrance end do not communicate with each other, the rotatable ring further has an inner ring portion and an outer ring portion fitting over the inner ring portion, the inner ring portion has a through hole defined through a radial direction of the inner ring portion for receiving the sealing member, the sealing member has a closed portion adjacent to the opening, wherein when one of the exit end and the entrance end is moved out of the opening, the end moved out of the opening is blocked by the closed portion, such that the exit end and the entrance end do not communicate with each other.

2. The quick connector according to claim 1, wherein the valve body has a sleeving portion formed at the rear chamber, a quick-release assembly has a sleeve fitting over an outer periphery of the sleeving portion, and a spring is fitted between the sleeving portion and the sleeve for pushing the sleeve forward with respect to the sleeving portion, a plurality of stopping balls is surrounding the sleeving portion for mating with the male connector and for preventing the male connector from being detached off the quick connector after the quick connector is mated with the male connector, and wherein when the sleeve is moved backward with respect to the sleeving portion, the male connector is releasable from the quick connector.

3. The quick connector according to claim 2, wherein the sleeving portion and the sleeve are partially recessed at corresponding portions thereof so as to form a groove together, the outer ring portion of the rotatable ring has a stopping block inserted into the groove along an axial direction of the rotatable ring, wherein when the stopping block is moved to two ends of the groove along with the rotation of the rotatable ring, the stopping block is located at the full open position and the full close position, respectively, wherein the sleeve has a recessed portion axially extending from the groove, wherein when the rotatable ring is located at the full close position, the recessed portion is aimed at the stopping block, and the sleeve is only moved backward with respect to the sleeving portion when the recessed portion is aimed at the stopping block.

4. The quick connector according to claim 1, wherein inner ring portion has an inner surface facing the partition segment, the inner surface is located at a wall of the inner ring portion having the closed portion and adjacent to the through hole, a gas drain groove is recessed from the inner surface and closely adjacent to the through hole, wherein when one of the exit end and the entrance end is moved out of the opening, the end moved out of the opening communicates with the gas drain groove so as to relief gases left in the rear chamber.

* * * * *